United States Patent
Fujiwara (10) Patent No.: US 9,919,672 B2
(45) Date of Patent: Mar. 20, 2018

(54) FAR SIDE AIRBAG DEVICE AND VEHICLE SEAT

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/249,855

(22) Filed: Aug. 29, 2016

(65) Prior Publication Data
US 2017/0072893 A1 Mar. 16, 2017

(30) Foreign Application Priority Data

Sep. 11, 2015 (JP) .................................. 2015-179825

(51) Int. Cl.
| | |
|---|---|
| *B60R 21/16* | (2006.01) |
| *B60R 21/207* | (2006.01) |
| *B60N 2/46* | (2006.01) |
| *B60R 21/231* | (2011.01) |

(Continued)

(52) U.S. Cl.
CPC .......... *B60R 21/207* (2013.01); *B60N 2/4606* (2013.01); *B60R 21/237* (2013.01); *B60R 21/23138* (2013.01); *B60R 2021/0048* (2013.01); *B60R 2021/23146* (2013.01); *B60R 2021/23161* (2013.01)

(58) Field of Classification Search
CPC .... B60R 21/23138; B60R 2021/23146; B60R 2021/0039

USPC ................................. 280/730.2, 743.1, 743.2
See application file for complete search history.

(56) References Cited

U.S. PATENT DOCUMENTS 5,531,470 A * 7/1996 Townsend .................. B60J 5/06
280/730.1
5,746,443 A * 5/1998 Townsend .................. B60J 5/06
280/728.2

(Continued)

FOREIGN PATENT DOCUMENTS

DE 103 45 677 A1 5/2005
JP 2005-40248 A 2/2005

(Continued)

OTHER PUBLICATIONS

Feb. 2, 2017 Extended Search Report issued in European Patent Application No. 16187327.8.

*Primary Examiner* — Toan To
(74) *Attorney, Agent, or Firm* — Oliff PLC (57) ABSTRACT

A far side airbag device and a vehicle seat with which, in a structure in which an armrest is connected to a region at a vehicle width direction middle side of a seatback, a portion of an airbag may be inflated and expanded between the armrest and an occupant. In a far side airbag device, a side airbag is disposed between a side frame and a proximal end of an armrest at a vehicle width direction middle side of a seatback. A distal end of the armrest projects forward from the seatback and the proximal end of the armrest is connected to the side frame. In the inflated and expanded state, a vertical direction portion of the side airbag overlaps with the armrest in side view. In the folded state, a vertical direction portion of the side airbag overlaps with the armrest in side view.

13 Claims, 6 Drawing Sheets (51) Int. Cl.
*B60R 21/237* (2006.01)
*B60R 21/00* (2006.01)

(56) References Cited

U.S. PATENT DOCUMENTS

| | | | | |
|---|---|---|---|---|
| 5,913,536 | A * | 6/1999 | Brown | B60R 21/207 |
| | | | | 280/728.2 |
| 7,946,616 | B2 * | 5/2011 | Ochiai | B60R 21/23138 |
| | | | | 280/730.2 |
| 8,534,702 | B2 * | 9/2013 | Suzuki | B60R 21/23138 |
| | | | | 280/730.2 |
| 8,651,515 | B2 * | 2/2014 | Baba | B60R 21/233 |
| | | | | 280/729 |
| 9,004,526 | B2 * | 4/2015 | Fukawatase | B60R 21/231 |
| | | | | 280/729 |
| 9,027,957 | B2 * | 5/2015 | Baba | B60R 21/23138 |
| | | | | 280/729 |
| 2006/0131847 | A1 * | 6/2006 | Sato | B60R 21/207 |
| | | | | 280/730.2 |
| 2009/0001695 | A1 * | 1/2009 | Suzuki | B60R 21/231 |
| | | | | 280/730.2 |
| 2010/0295277 | A1 | 11/2010 | Ochiai et al. | |
| 2012/0049498 | A1 | 3/2012 | Wiik et al. | |
| 2012/0091697 | A1 | 4/2012 | Wiik et al. | |
| 2013/0197764 | A1 | 8/2013 | Thomas | |
| 2014/0151984 | A1 | 6/2014 | Fukawatase et al. | |
| 2015/0203065 | A1 * | 7/2015 | Egusa | B60R 7/04 |
| | | | | 280/730.2 |

FOREIGN PATENT DOCUMENTS

| | | |
|---|---|---|
| JP | 2005-119506 A | 5/2005 |
| JP | 2011-178189 A | 9/2011 |
| JP | 2012-051557 A | 3/2012 |
| JP | 2012-081958 A | 4/2012 |
| JP | 2014-108740 A | 6/2014 |
| JP | 2014-237409 A | 12/2014 |
| WO | 94/01297 A1 | 1/1994 |

* cited by examiner

FAR SIDE AIRBAG DEVICE AND VEHICLE SEAT

CROSS-REFERENCE TO RELATED APPLICATION

This application is based on and claims priority under 35 USC 119 from Japanese Patent Application No. 2015-179825 filed on Sep. 11, 2015, which is incorporated by reference herein in its entirety.

BACKGROUND

Technical Field

The present invention relates to a far side airbag device and a seat for a vehicle.

Related Art

A passenger restraint system is known (see Japanese Patent Application Laid-Open (JP-A) No. 2012-081958 (Patent Document 1)) in which a lower portion of an airbag bag body, which is for restricting movement of an occupant of a vehicle toward a collision side when a side collision occurs, expands between the occupant and a console in a region that is at the lower side relative to an upper face of the console.

However, in a structure in which an armrest is connected to a vehicle width direction middle side of a seatback, there is scope for improvement in regard to inflating and expanding a portion of an airbag between the armrest and an occupant.

SUMMARY

An object of the present invention is to provide, for a structure in which an armrest is connected to a region at a vehicle width direction middle side of a seatback, a far side airbag device and a vehicle seat at which a portion of an airbag may be inflated and expanded between the armrest and an occupant.

A far side airbag device according to a first aspect of the present invention includes an airbag disposed between a frame and an armrest, the frame being provided at a side portion at a vehicle width direction middle side of a seatback, and a proximal end of the armrest being connected to the frame, wherein, in an inflated and expanded state of the airbag, a vertical direction portion of the airbag overlaps with the armrest in a usage mode of the armrest in side view, and in a folded state of the airbag, the vertical direction portion of the airbag overlaps with the armrest in the usage mode in side view.

In this far side airbag device, in, for example, a state in which no occupant is sitting on the vehicle seat, the vertical direction portion of the inflated and expanded airbag overlaps (coincides) in side view with the armrest in the usage mode. In the folded state in which this airbag is disposed between the frame and the proximal end of the armrest, the vertical direction portion overlaps in side view with the armrest. Therefore, the vertical direction portion of the airbag may be inflated and expanded in a narrow space between the armrest and an occupant.

Thus, the first aspect may be employed in a vehicle seat in which the armrest is connected to a region at the vehicle width direction middle side of the seatback, and a portion of the airbag may be inflated and expanded between the armrest and an occupant.

In a far side airbag device according to a second aspect, in the first aspect, in the inflated and expanded state, a portion at a lower end side of the airbag overlaps with the armrest in side view, and in the folded state, the portion at the lower end side is disposed to overlap with the armrest in side view.

In this far side airbag device, the portion at the lower end side of the airbag overlaps with the armrest in the usage mode in side view. Therefore, the portion at the lower end side of the airbag that inflates and expands between the armrest and an occupant may be (completely) inflated and expanded in a short duration.

In a far side airbag device according to a third aspect, in the first aspect or the second aspect, the airbag in the folded state is disposed such that the vertical direction portion is disposed at a front side relative to a connecting structure that connects the armrest to the frame.

In this far side airbag device, the region of the airbag in the folded state that overlaps with the armrest in side view is disposed at the front side relative to the connecting structure of the seatback with the armrest. Therefore, when the airbag is being inflated and expanded from between the frame and the proximal end of the armrest to between the armrest and the occupant, (a portion of) a reaction force associated with the inflation and expansion of the airbag is braced from the rear by the connecting structure.

In a far side airbag device according to a fourth aspect, in any one of the first to third aspects, a region of the airbag that serves as a lower portion in the vertical direction in the inflated and expanded state is folded in a bellows fold, and gas is supplied to the region that serves as the lower portion.

In this far side airbag device, when gas is supplied to the region of the airbag that serves as the lower portion in the inflated and expanded state (the region that is folded in the bellows fold), the folding of this region is unfolded while the airbag inflates and expands. Because the bellows fold can be unfolded in a short duration, the lower portion in the vertical direction of the airbag may be inflated and expanded between the armrest and the occupant before the occupant moves significantly toward the side thereof at which the armrest is disposed.

In a far side airbag device according to a fifth aspect, in the fourth aspect, a region of the airbag that serves as an upper portion in the inflated and expanded state is folded in a roll fold, the upper portion including a region that is disposed to sideward of the head of an occupant.

In this far side airbag device, when the lower portion of the airbag that is folded in the bellows fold inflates and expands, the upper portion receives a supply of gas from the lower portion and inflates and expands while the roll fold is unfolded. Because the roll fold unfolds stably, the upper portion of the airbag is unlikely to interfere with the head of the occupant or the like in association with the inflation and expansion.

A vehicle seat according to a sixth aspect includes: a seatback; an armrest of which a proximal end is connected to a frame, the frame being provided at a side portion at a vehicle width direction middle side of the seatback, and a distal end of the armrest projecting forward from the seatback in a usage mode of the armrest; and a far side airbag device including an airbag disposed between the frame and the proximal end of the armrest, in an inflated and expanded state of the airbag, a vertical direction portion of the airbag overlapping with the armrest in the usage mode in side view, and in a folded state of the airbag, the vertical direction portion of the airbag overlapping with the armrest in the usage mode in side view.

In this vehicle seat, in, for example, a state in which no occupant is sitting on the vehicle seat, the vertical direction portion of the inflated and expanded airbag overlaps (coincides) in side view with the armrest in the usage mode. In the folded state in which this airbag is disposed between the frame of the seatback and the proximal end of the armrest, the vertical direction portion overlaps in side view with the armrest. Therefore, the vertical direction portion of the airbag may be inflated and expanded in a narrow space between the armrest and an occupant.

Thus, the sixth aspect is a structure in which the armrest is connected to a region at the vehicle width direction middle side of the seatback, and a portion of the airbag may be inflated and expanded between the armrest and an occupant.

In a vehicle seat according to a seventh aspect, in the sixth aspect, in the inflated and expanded state, a portion at a lower end side of the airbag overlaps with the armrest in side view, and in the folded state, the portion at the lower end side is disposed to overlap with the armrest in side view.

In this vehicle seat, the portion at the lower end side of the airbag overlaps with the armrest in the usage mode in side view. Therefore, the portion at the lower end side of the airbag that inflates and expands between the armrest and an occupant may be (completely) inflated and expanded in a short duration.

In a vehicle seat according to an eighth aspect, in the sixth aspect or the seventh aspect, the airbag in the folded state is disposed such that the vertical direction portion is disposed at a front side relative to a connecting structure that connects the armrest to the frame.

In this vehicle seat, the region of the airbag in the folded state that overlaps with the armrest in side view is disposed at the front side relative to the connecting structure of the seatback with the armrest. Therefore, when the airbag is being inflated and expanded from between the frame and the proximal end of the armrest to between the armrest and the occupant, (a portion of) a reaction force associated with the inflation and expansion of the airbag is braced from the rear by the connecting structure.

In a vehicle seat according to a ninth aspect, in the eighth aspect, the armrest is connected to the seatback via a turning pivot portion that serves as the connecting structure, the armrest being connected to be switchable, by turning about the proximal end side thereof, between the usage mode in which the distal end projects forward from the seatback and a stowed mode in which the armrest is stowed along the seatback in side view.

In this vehicle seat, the position of the armrest is switchable between the stowed mode and the usage mode by turning of the turning pivot portion of the armrest. Because a portion of the airbag in the folded state overlaps with the armrest in the usage mode in side view, the airbag may be inflated and expanded between the armrest and the occupant as described above. The region of the airbag that overlaps with the armrest in side view is disposed at the front side relative to the turning pivot portion that turnably supports the proximal end of the armrest. Therefore, a movable portion at the armrest side is unlikely to interfere with the airbag in the folded state in association with switching of the armrest between the stowed mode and the usage mode.

In a vehicle seat according to a tenth aspect, in the ninth aspect, the turning pivot portion comprises: a turning shaft to which the armrest is fixed, the turning shaft being turnably supported at the frame; and a cover member that covers the turning shaft from at least the seat front side thereof.

In this vehicle seat, the cover member is interposed between the turning shaft and the airbag that inflates and expands to forward. Therefore, transmission of a load associated with the inflation and expansion of the airbag to the turning shaft is prevented or effectively suppressed. Therefore, the position of the armrest is unlikely to change in association with the inflation and expansion of the airbag.

In a vehicle seat according to an eleventh aspect, in any one of the sixth to tenth aspects, a region of the airbag that serves as a lower portion in the vertical direction in the inflated and expanded state is folded in a bellows fold, and gas is supplied to the region that serves as the lower portion.

In this vehicle seat, when gas is supplied to the region of the airbag that serves as the lower portion in the inflated and expanded state (the region that is folded in the bellows fold), the folding of the lower portion is unfolded while the airbag inflates and expands. Because the bellows fold can be unfolded in a short duration, the lower portion in the vertical direction of the airbag may be inflated and expanded between the armrest and the occupant before the occupant moves significantly toward the side thereof at which the armrest is disposed.

In a vehicle seat according to a twelfth aspect, in the eleventh aspect, a region of the airbag that serves as an upper portion in the inflated and expanded state is folded in a roll fold, the upper portion including a region that is disposed to sideward of the head of an occupant.

In this vehicle seat, when the lower portion of the airbag that is folded in the bellows fold inflates and expands, the upper portion receives a supply of gas from the lower portion and inflates and expands while the roll fold is unfolded. Because the roll fold unfolds stably, the upper portion of the airbag is unlikely to interfere with the head of the occupant or the like in association with the inflation and expansion.

As described above, the present invention provides an excellent effect in that, in a structure in which an armrest is connected to a region at the vehicle width direction middle side of a seatback, a portion of an airbag may be inflated and expanded between the armrest and an occupant.

DETAILED DESCRIPTION

A far side airbag device 10 according to an exemplary embodiment of the present invention, and a vehicle seat 12 in which the far side airbag device 10 is employed, are described on the basis of FIG. 1 to FIG. 5. An arrow FR and an arrow UP that are shown as appropriate in the drawings indicate a front direction (a direction in which an occupant P who is a seated person faces) and an upper direction of the vehicle seat 12, respectively. Herebelow, where descriptions are given using the directions front, rear, up, down, left and right, unless particularly specified, these represent the front and rear in the seat longitudinal direction, up and down in the seat vertical direction, and left and right when facing forward in the seat longitudinal direction. In this exemplary embodiment, a seat longitudinal direction of the vehicle seat 12 matches the longitudinal direction of the vehicle, a seat vertical direction matches the vertical direction of the vehicle, and a seat width direction matches the vehicle width direction. An arrow IN that is marked as appropriate in the drawings indicates a vehicle width direction middle side of an automobile that serves as the vehicle in which the vehicle seat 12 is installed.

General Structure of the Vehicle Seat

Figure 1A:
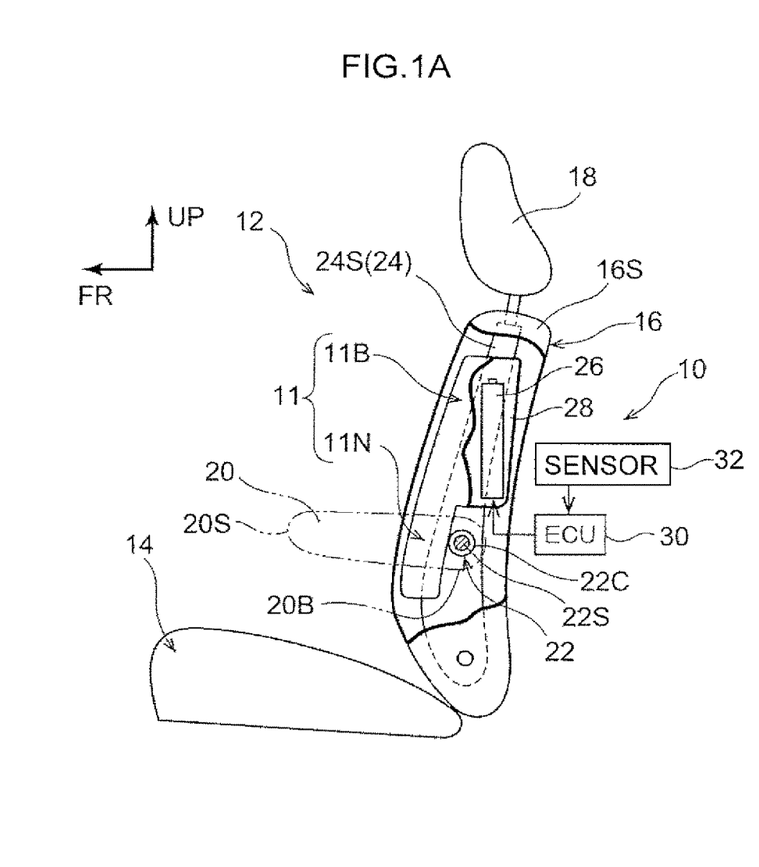
FIG. 1A is a diagram showing a far side airbag device and vehicle seat in accordance with an exemplary embodiment of the present invention, which is a side view in which portions of a seatback and a side airbag are cut away.
Figure 1B:
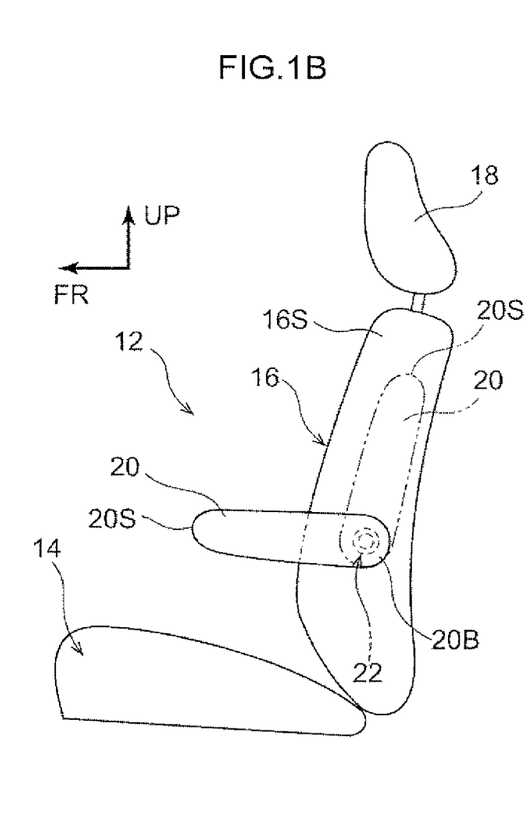
FIG. 1B is a side view showing the far side airbag device and vehicle seat in accordance with the exemplary embodiment of the present invention.
Figure 2A:
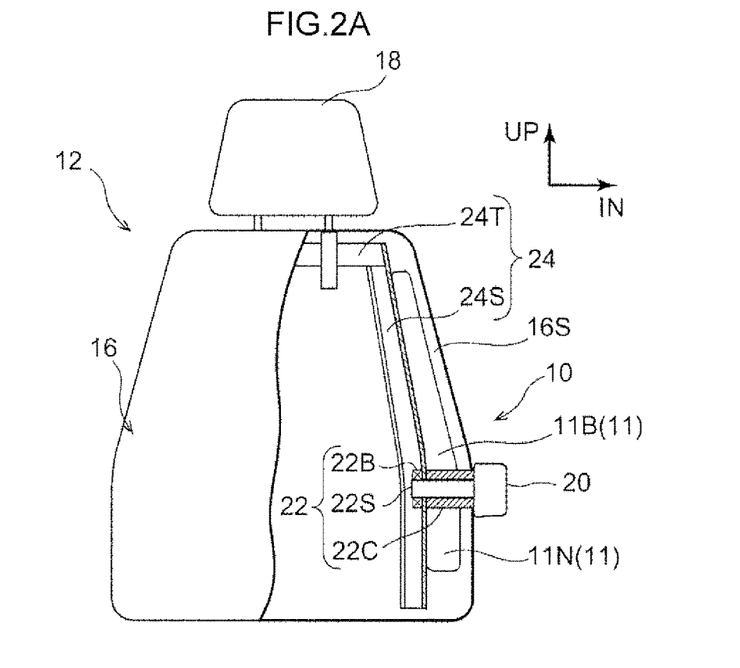
FIG. 2A is a diagram showing the far side airbag device and vehicle seat in accordance with the exemplary embodiment of the present invention, which is a front view in which a portion of the seatback is cut away.

As shown in FIG. 1A and FIG. 1B, the vehicle seat 12 is provided with a seat cushion 14, which is a sitting portion on which a seated person sits, and a seatback 16, which is a back portion of which the lower end is linked to the rear end of the seat cushion 14. In this exemplary embodiment, a headrest 18 is provided at the upper end of the seatback 16. As shown in FIG. 2A, excluding a lower portion in the vertical direction, a central portion and an upper portion of the seatback 16 according to this exemplary embodiment gradually decrease in width toward the upper side in front view.

The vehicle seat 12 is provided with an armrest 20 that is connected to a side portion of the seatback 16. In this exemplary embodiment, the armrest 20 is disposed at a side portion 16S at the vehicle width direction middle side of the seatback 16. In the vertical direction, the armrest 20 is disposed between a vertical direction central portion and a lower end portion of the seatback 16 (close to a region at which the gradual decrease in width begins). The armrest 20 is switchable between a stowed mode in which the armrest 20 is stowed along the side portion of the seatback 16, as shown by the imaginary lines in FIG. 1B, and a usage mode in which a distal end 20S of the armrest 20 projects forward from the seatback 16, as shown by the solid lines in FIG. 1B. In other words, the armrest 20 is structured as a tiltable-type armrest.

Figure 2B:
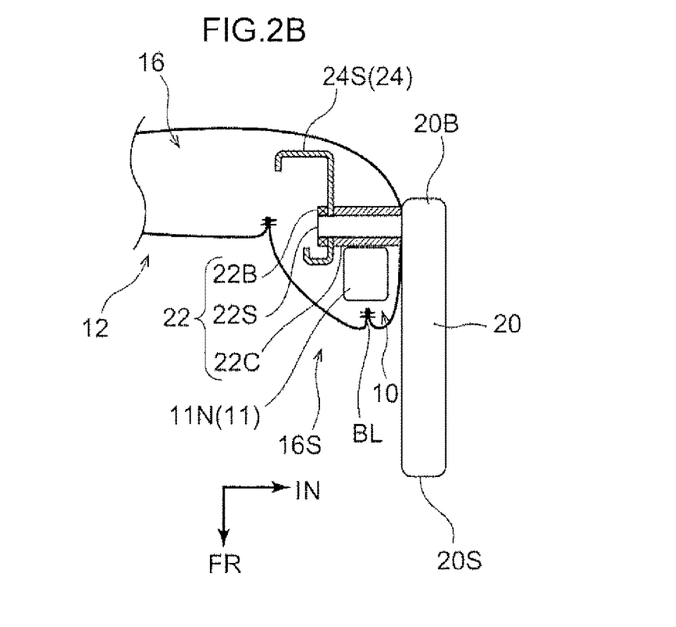
FIG. 2B is a diagram showing the far side airbag device and vehicle seat in accordance with the exemplary embodiment of the present invention, which is a plan sectional view showing an enlargement of a connection portion of an armrest.

To be specific, as shown in FIG. 2A and FIG. 2B, the armrest 20 is turnably supported, at a side of the armrest 20 at which a proximal end 20B is provided, at a seatback frame 24 that structures the seatback 16, via a turning pivot portion 22 that serves as a connecting structure. The seatback frame 24 includes a pair of left and right side frames 24S and a top frame 24T that spans between upper ends of the pair of side frames 24S. The seatback frame 24 supports the armrest 20 at the side frame 24S that is at the vehicle width direction middle side. This side frame 24S corresponds to a frame of the present invention.

More specifically, the turning pivot portion 22 includes a turning shaft 22S, a bearing 22B, and a tubular spacer 22C that serves as a cover member. The turning shaft 22S is fixed to the proximal end 20B of the armrest 20. The turning shaft 22S projects from the proximal end 20B to the side thereof at which the side frame 24S is disposed. The bearing 22B is attached to the side frame 24S and turnably supports the turning shaft 22S. The tubular spacer 22C is fixed to the side frame 24S in a state in which the turning shaft 22S is inserted into the tubular spacer 22C. The tubular spacer 22C constitutes a structure that prevents the turning shaft 22S, which is a movable portion of the turning pivot portion 22, from touching a cushion material, which is not shown in the drawings, that structures the seatback 16.

The armrest 20 turns relative to the seatback 16 integrally with the turning shaft 22S of the turning pivot portion 22 (about the side of the armrest 20 at which the bearing 22B is provided). Thus, the armrest 20 is structured to be switchable between the stowed mode and the usage mode as described above. In the stowed mode in this exemplary embodiment, the distal end 20S is oriented upward and disposed along the side portion 16S of the seatback 16. The armrest 20 may be locked and unlocked at the usage position and the stowed position by a locking structure, which is not shown in the drawings. In the descriptions below, unless particularly specified, the armrest 20 is assumed to be set in the usage mode.

The vehicle seat 12 described above is, for example, a driver seat or assistant driver seat in a vehicle in which a center console is not provided, a seat in a second or subsequent row of seats of a type that are separate (divided) between left and right, or the like.

General Overall Structure of the Far Side Airbag Device

The far side airbag device 10 is a structure that restricts movement of an occupant P of the vehicle seat 12 toward the impact side when there is a side impact at the opposite side in the vehicle width direction from the side at which the vehicle seat 12 is disposed (a far side relative to the occupant P). That is, the far side airbag device 10 is a structure that restrains the occupant P from the impact side thereof when there is a side impact against the far side from the vehicle seat 12. Concrete descriptions are given below.

The far side airbag device 10 is provided with an inflator 26 and a side airbag 28. The inflator 26 serves as a gas generation device. The side airbag 28 serves as an airbag that receives a gas supply from the inflator 26 and inflates and expands. In the descriptions below, a mechanical structural portion of the far side airbag device 10 of which the inflator 26, the side airbag 28 and the like are principal portions is referred to as an airbag module 11.

As shown in FIG. 1A and FIG. 2A, in the state in which the side airbag 28 is folded, the airbag module 11 is stowed inside the side portion 16S at the vehicle width direction middle side of the seatback 16 the side at which the armrest 20 is connected). That is, the side airbag 28 in the folded state is disposed inside the side portion 16S, between the armrest 20 and the side frame 24S in the vehicle width direction. The folded state of the side airbag 28 is described below in terms of the structure of the airbag module 11.

The side airbag 28 is a structure that receives a supply of gas from the inflator 26 and, as shown in FIG. 1A and FIG. 2A, inflates and expands at the vehicle width direction middle side relative to the occupant P. At this time, a burst line BL formed at a front portion of the side portion 16S of the seatback 16 (see FIG. 2B) is split open by inflation pressure of the side airbag 28, allowing inflation and expansion of the side airbag 28 toward the front.

Figure 3:
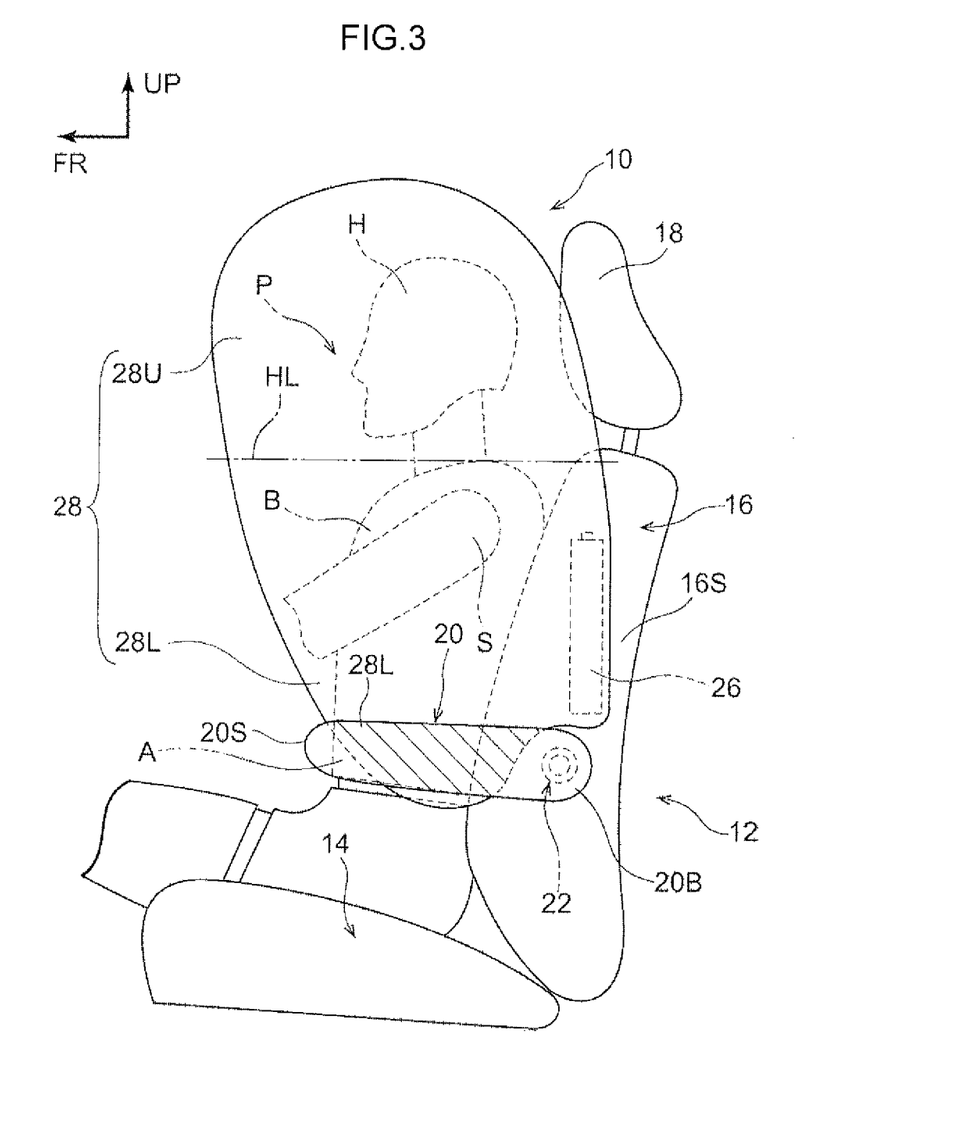
FIG. 3 is a side view showing an inflated and expanded state of the side airbag of the far side airbag device and vehicle seat in accordance with the exemplary embodiment of the present invention.

As shown in FIG. 3, the side airbag 28 in the inflated and expanded state is structured to cover the head H, shoulder S, chest B and abdomen A of the occupant P in side view from the vehicle width direction middle side thereof. In consequence, the side airbag 28 restrains the occupant P who is moving to the vehicle width direction middle side at each of the head H, shoulder S, chest B and abdomen A. A region of the side airbag 28 that covers the head H is a structure that inflates and expands to project upward beyond the upper end of the seatback 16.

In this exemplary embodiment, an imaginary horizontal line HL that passes through the side airbag 28 at a vicinity of the upper end of the seatback 16 is substantially at the center of the side airbag 28 in the vertical direction. Hereblow, the upper side of the side airbag 28 demarcated by this horizontal line HL is referred to as an upper portion 28U and a lower side of the same is referred to as a lower portion 28L. The upper portion 28U includes the region of the side airbag 28 that inflates and expands to sideward (at the vehicle width direction middle side) of the head H of the occupant P.

At least a portion of a region of the lower portion 28L of the side airbag 28 that covers the abdomen A of the occupant P overlaps with the armrest 20 in side view (viewed in the vehicle width direction). In a state in which no occupant P is sitting on the vehicle seat 12 (or a non-restraining state in which the side airbag 28 is not in contact with an occupant P), a portion of the lower end side of the side airbag 28 in the inflated and expanded state is structured to overlap with the armrest 20 in side view. Below, the portion of the side airbag 28 in the inflated and expanded state that overlaps with the armrest 20 in side view (the region that is hatched in FIG. 3) is referred to as the overlapping expanded portion 28LL.

The inflator 26 is disposed at a rear portion of the interior of the lower portion 28L of the side airbag 28 in the inflated and expanded state. The inflator 26 is constituted to produce gas inside the lower portion 28L when activated. A flow regulation sheet (a diffuser) for regulating the flow of gas may be provided around the inflator 26. The inflator 26 is disposed at the upper side relative to the armrest 20. In this exemplary embodiment, the inflator 26 is disposed upward and rearward of the turning pivot portion 22.

As shown in FIG. 1, the inflator 26 described above is electronically connected to an ECU 30, which is a control device. The ECU 30 is electronically connected to a sensor 32 that detects a side impact of the automobile in which the far side airbag device 10 is employed. The sensor 32 according to this exemplary embodiment is capable of detecting an occurrence of a side impact (or that a side impact is unavoidable) and the side at which the side impact occurs (the right side or the left side). The ECU 30 and the sensor 32 may be regarded as being structural elements of the far side airbag device 10 according to the present exemplary embodiment.

The ECU 30 is configured to activate the inflator 26 when the sensor 32 detects a side impact (or unavoidable side impact) at the opposite side in the vehicle width direction from the side at which the vehicle seat 12 is disposed (i.e., the far side). The ECU 30 may also be configured to activate the inflator 26 when the sensor 32 detects a side impact (or unavoidable side impact) at the side in the vehicle width direction at which the vehicle seat 12 is disposed (a near side).

Airbag Module

As described above, the airbag module 11 is stowed inside the side portion 16S at the side of the seatback 16 at which the armrest 20 is disposed, in a state in which the side airbag 28 incorporating the inflator 26 is folded up and formed into a module (package). In this state, the airbag module 11 is fixed to the side frame 24S of the seatback 16 by a fastening structure, which is not shown in the drawings.

As shown in FIG. 1A, the airbag module 11 is formed in a shape that includes a wide portion 11B that is wide in side view and a narrow portion 11N that is narrower in width than the wide portion 11B. The wide portion 11B is disposed at the upper side relative to the armrest 20. That is, the wide portion 11B includes a region in which the inflator 26 is disposed, and has a width that extends from rearward to forward of the turning pivot portion 22 in side view.

The narrow portion 11N is pendant from a lower-front portion of the wide portion 11B. The narrow portion 11N passes at the front side relative to the turning pivot portion 22; a lower end of the narrow portion 11N reaches lower than the armrest 20. Thus, the narrow portion 11N, which is to say a vertical direction portion of the airbag module 11, overlaps with the armrest 20 in side view. That is, the side airbag 28 in the folded state is disposed between the side frame 24S and the proximal end 20B of the armrest 20 in a state (position and attitude) in which a portion at the lower end side of the side airbag 28 overlaps with the armrest 20 in side view.

Figure 5A:
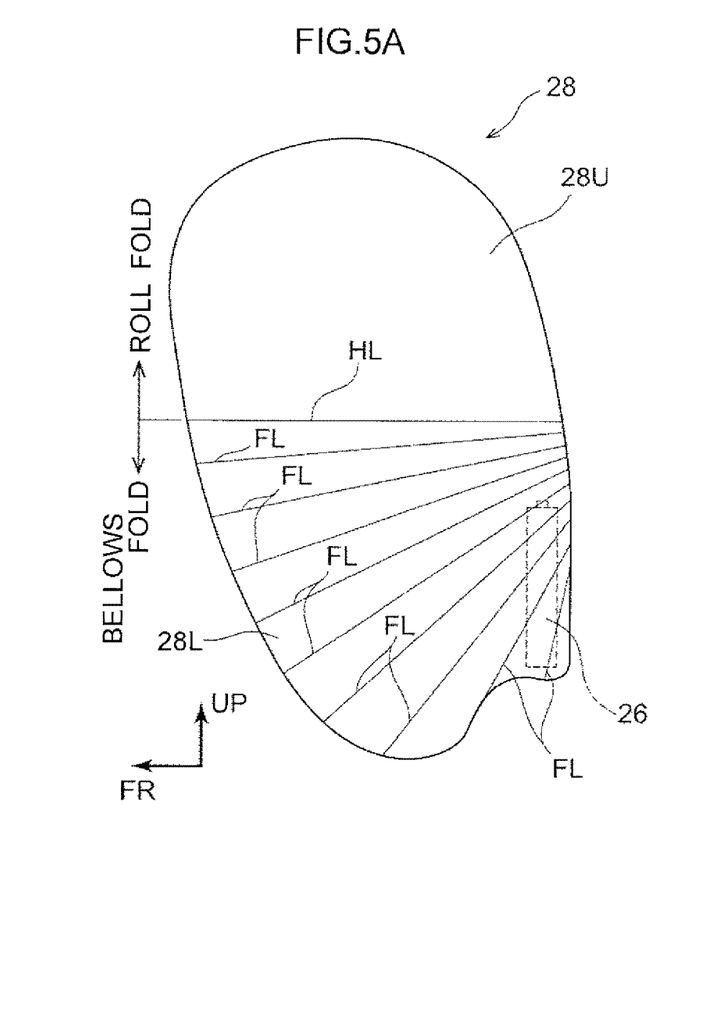
FIG. 5A is a diagram for describing a folded state of the side airbag of the far side airbag device and vehicle seat in accordance with the exemplary embodiment of the present invention, which is a diagram showing a flat pattern of the side airbag.
Figure 5B:
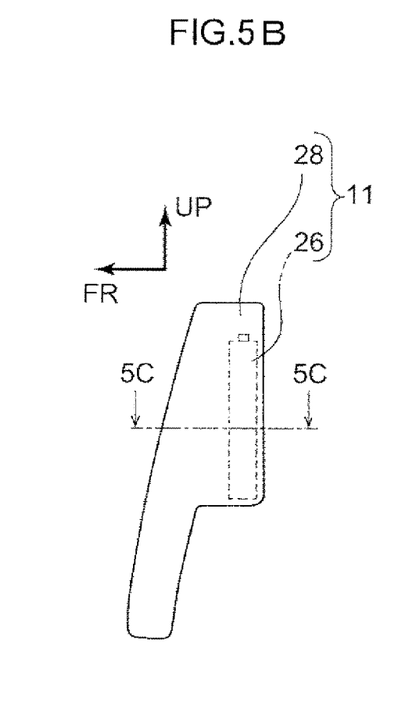
FIG. 5B is a diagram for describing the folded state of the side airbag of the far side airbag device and vehicle seat in accordance with the exemplary embodiment of the present invention, which is a schematic side view of an airbag module.
Figure 5C:
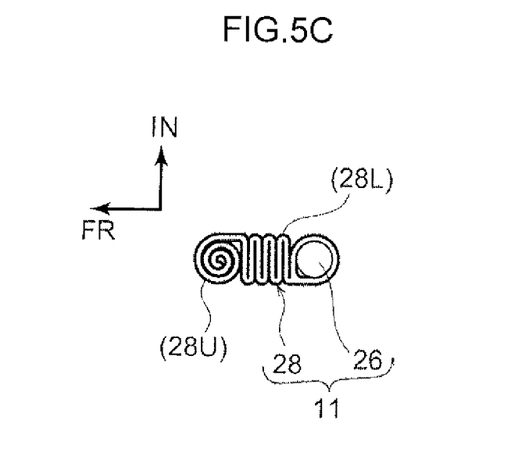
FIG. 5C is a diagram for describing the folded state of the side airbag of the far side airbag device and vehicle seat in accordance with the exemplary embodiment of the present invention, which is a sectional view cut along line 5C-5C of FIG. 5B.

The folded state of the side airbag 28 is now described with reference to FIG. 5A to FIG. 5C. FIG. 5B shows a schematic side view of the airbag module 11 removed from the seatback 16. FIG. 5A shows a flat pattern of the side airbag 28, in which the side airbag 28 is expanded (the folds are unfolded) without gas being supplied. FIG. 5C shows a sectional view taken along line 5C-5C in FIG. 5B.

As shown in these drawings, the region of the side airbag 28 that serves as the upper portion 28U, from the upper end side to the horizontal line HL, is folded up in a roll fold by roll-folding with the longitudinal direction as an axial direction. In contrast, the region of the side airbag 28 that serves as the lower portion 28L is folded up in a bellows fold by bellows-folding. Fold lines FL of the bellows fold form angles with lines parallel to the horizontal line HL (which are not shown in the drawings) that gradually increase from the upper side to the lower side. Thus, the lower portion 28L of the side airbag 28 forms a structure that is bellows-folded in the manner of closing a hand fan. As shown in FIG. 5C, the side airbag 28 is formed into a structure in which the upper portion 28U folded in the roll fold is disposed at the front side relative to the lower portion 28L folded in the bellows fold.

States of inflation and expansion of the side airbag 28 of the airbag module 11 described above are described below in association with operation of the present exemplary embodiment.

Operation

Now, operation of the present exemplary embodiment is described. Here, operation of the far side airbag device 10 and the vehicle seat 12 when a side impact occurs at the side (hereinafter referred to as "the far side") in the vehicle width direction that is opposite to the side at which the vehicle seat 12 is disposed is described.

In the far side airbag device 10 with the structure described above, when the inflator 26 is activated by the ECU 30 when there is a side impact against the far side, gas produced by the inflator 26 is supplied to the region of the side airbag 28 that serves as the lower portion 28L. As a result, the side airbag 28 starts to inflate and expand forward while the bellows fold is unfolded, and the burst fine BL is split open by the inflation pressure of the side airbag 28. Hence, the side airbag 28 projects forward from the side portion 16S of the seatback 16, the bellows fold is unfolded further, and the lower portion 28L inflates and expands. Then, the roll fold above the lower portion 28L of the side airbag 28 is unfolded and the upper portion 28U inflates and expands.

Thus, at the time of a side collision at the far side, the shoulder S, chest B and abdomen A of an occupant P of the vehicle seat 12 are mainly restrained by the lower portion 28L. Meanwhile, the head H of the occupant P is mainly restrained by the upper portion 28U. Thus, with the far side airbag device 10, movement of the occupant P of the vehicle seat 12 toward the collision side is restricted by the side airbag 28, and the occupant P is protected against the side collision at the far side.

In this structure, a vertical direction portion of the side airbag 28 in the folded state (the airbag module 11) that is disposed between the side frame 24S of the seatback 16 and the proximal end 20B of the armrest 20 overlaps with the armrest 20 in the usage mode thereof in side view. Consequently, the vertical direction portion of the side airbag 28 inflates and expands in a narrow gap between the armrest 20 and the occupant P.

This point is described further through comparison with a comparative mode in which the whole of the side airbag 28 in the folded state is disposed at the upper side of the armrest 20. In this comparative mode, for example, in a state in which no occupant P is seated, the side airbag 28 inflates and expands such that the overlapping expanded portion 28LL overlaps with the armrest 20 in side view. However, in the comparative mode, a state in which an occupant P is sitting on the vehicle seat 12 is a state in which the overlapping expanded portion 28LL enters into the narrow gap between the armrest 20 and the occupant P from the upper side of the armrest 20. Thus, in this comparative mode it is difficult for the overlapping expanded portion 28LL to inflate and expand into the narrow space between the armrest 20 and the occupant P. In contrast, in the present exemplary embodiment as described above, because the vertical direction portion of the side airbag 28 overlaps with the armrest 20 in the usage mode in side view, the overlapping expanded portion 28LL may be inflated and expanded in the narrow gap between the armrest 20 and the occupant P.

Thus, the far side airbag device 10 may be employed in the vehicle seat 12 in which the armrest 20 is connected to the side portion 16S at the vehicle width direction middle side of the seatback 16, and the side airbag 28 may be inflated and expanded between the armrest 20 and an occupant P.

Figure 4A:
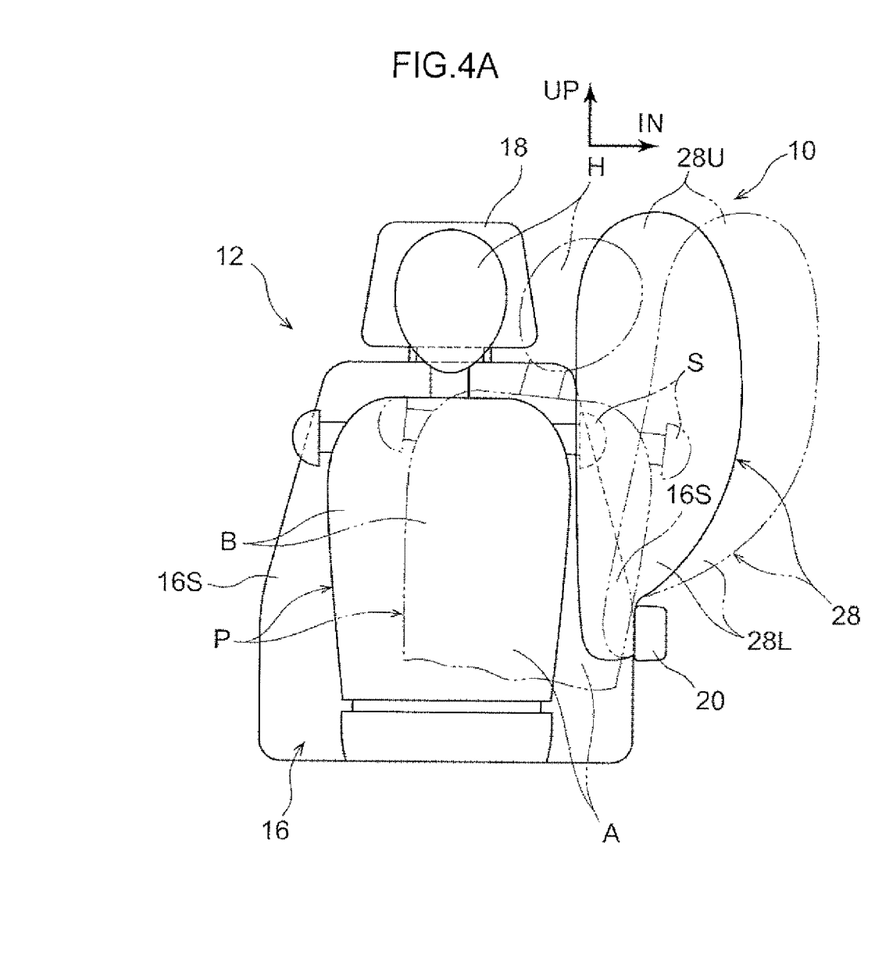
FIG. 4A is a front view schematically showing the inflated and expanded state of the side airbag of the far side airbag device and vehicle seat in accordance with the exemplary embodiment of the present invention.
Figure 4B:
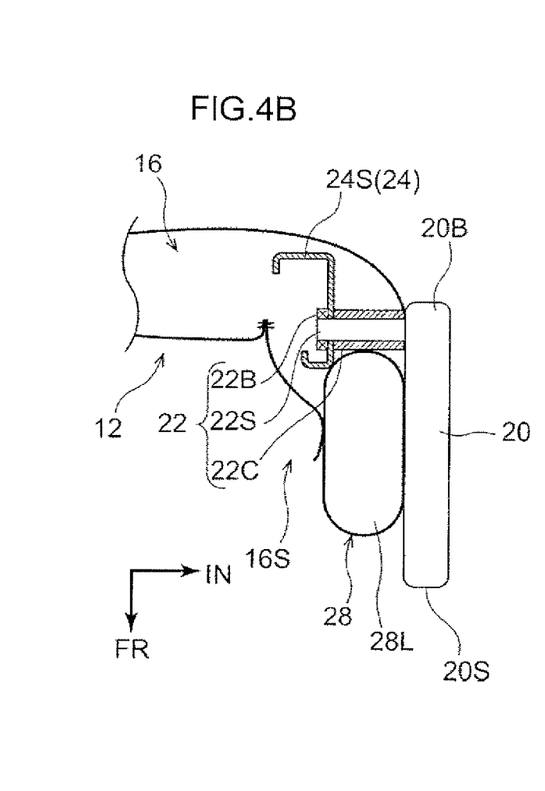
FIG. 4B is a diagram schematically showing the inflated and expanded state of the side airbag of the far side airbag device and vehicle seat in accordance with the exemplary embodiment of the present invention, which is a plan sectional view showing an enlargement of a vicinity of a lower end side of the side airbag.

Furthermore, because the vertical direction portion of the side airbag 28 may be inflated and expanded between the armrest 20 and the occupant P, an airbag with a larger volume than in the comparative mode described above may be employed. In this exemplary embodiment, the side airbag 28 is structured with a large volume that reaches from the abdomen A to the head H of the occupant P. Moreover, because the lower end side of the lower portion 28L of the side airbag 28 in the inflated and expanded state is disposed between the armrest 20 and the occupant P, a reaction force when the occupant P moving toward the collision side is restrained by the side airbag 28, as shown by the imaginary lines in FIG. 4A, is braced by the armrest 20.

Therefore, with the far side airbag device 10 and the vehicle seat 12, protection performance of the occupant P by the side airbag 28 is higher than in the comparative mode described above.

The side airbag 28, of which the overlapping expanded portion 28LL formed by the portion at the lower end side in the inflated and expanded state overlaps with the armrest 20 in side view, is a structure of which a portion at the lower end side in the folded state overlaps with the armrest 20 in side view. Therefore, the overlapping expanded portion 28LL that is inflated and expanded in the narrow gap between the armrest 20 and the occupant P may be (completely) inflated and expanded in a short duration from the start of the supply of gas.

In particular, the side airbag 28 serves as the airbag module 11 in which the region that serves as the lower portion 28L incorporates the inflator 26 and is folded in the bellows fold in the folded state. Therefore, when the inflator 26 is activated, gas is supplied to the region serving as the lower portion 28L, and the airbag inflates and expands while the folding of the lower portion 28L is unfolded. This bellows fold unfolds in a shorter duration than an alternative folding mode such as, for example, a roll fold or the like. Therefore, the side airbag 28 may be more assuredly inflated and expanded between the armrest 20 and the occupant P before the occupant P moves significantly toward the side at which the armrest 20 is disposed.

Because the side airbag 28 passes between the armrest 20 and the occupant P in the process of inflation and expansion, which is to say that the side airbag 28 inflates and expands while being guided by the armrest 20, the expanded attitude of the side airbag 28 is assured. In particular, the region of the side airbag 28 that serves as the lower portion 28L is bellows-folded in the mode in which the angles of the fold lines relative to the horizontal direction gradually increase. Consequently, at the start of the process of inflation and expansion, the side airbag 28 is guided by the armrest 20 such that a region formed from a front edge to a lower edge of the lower portion 28L in the inflated and expanded state describes an arc in side view (in the manner of a hand fan opening). Thus, the expanded attitude of the side airbag 28 is even more assured.

Therefore, with the far side airbag device 10 and the vehicle seat 12, if an occupant P adopts an irregular sitting attitude ("out of position" (OOP)), interference between the occupant P and the side airbag 28 is unlikely to occur. Moreover, the side airbag 28 serves as the airbag module 11 in which the region that serves as the upper portion 28U is folded in the roll fold in the folded state. The roll fold unfolds more stably (in a manner in which changes of attitude in the process of inflation and expansion are small) than an alternative folding mode such as, for example, a bellows fold or the like. Therefore, the upper portion 28U of the side airbag 28 is unlikely to interfere with the head H or shoulder S of the occupant P in the process of inflation and expansion.

A portion of the side airbag 28 in the folded state (the narrow portion 11N of the airbag module 11) is stowed inside the side portion 16S at the front side relative to the turning pivot portion 22 that serves as the connecting structure between the proximal end 20B of the armrest 20 and the side frame 24S. Therefore, when that portion of the side airbag 28 is inflating and expanding from the side portion 16S to between the armrest 20 and the occupant P, a reaction force associated with the inflation and expansion of the airbag is braced from the rear by the turning pivot portion 22. Therefore, in the far side airbag device 10 and the vehicle seat 12, the side airbag 28 may be excellently inflated and expanded in a structure in which the narrow portion 11N that is the lower portion of the airbag module 11 is not supported from the rear by the seatback frame 24. From another perspective, a member such as a reaction force plate or the like that supports the narrow portion 11N from the rear may be omitted or reduced in size.

In the vehicle seat 12 that is provided with the tiltable-type armrest 20, a portion of the side airbag 28 in the folded state is disposed forward of the turning pivot portion 22 that is the connecting structure of the armrest 20 with the seatback 16 (i.e., a region that does not displace in side view). Therefore, interference of the armrest 20 changing position with the side airbag 28 in the folded state is suppressed. In particular, because the turning shaft 22S of the turning pivot portion 22 is covered with the tubular spacer 22C that serves as a cover member, interference of the turning shaft 22S that is a movable portion of the turning pivot portion 22 with the side airbag 28 in the folded state is prevented. Moreover, input of a load to the turning shaft 22S in association with the inflation and expansion of the side airbag 28, and a change in position (attitude) of the armrest 20, is prevented or effectively suppressed by the tubular spacer 22C.

VARIANT EXAMPLES

In the exemplary embodiment described above and variant examples, examples are illustrated in which the inflator 26 is activated when there is a side impact at the far side relative to the vehicle seat 12, but the present invention is not limited thus. For example, configurations are possible in which the inflator 26 is activated by the ECU 30 when there is a small overlap collision in which another vehicle collides with the vehicle at a vehicle width direction outer end portion of the far side, when there is an oblique collision in which another vehicle collides with the vehicle at the far side from diagonally forward thereof, and the like.

In the exemplary embodiment described above and variant examples, examples are illustrated in which the side airbag 28 restrains (protects) the head H of an occupant P, but the present invention is not limited thus. For example, the side airbag 28 may be a structure that does not include a portion that restrains the head.

In the exemplary embodiment described above, an example is illustrated in which the armrest 20 is connected to (the side frame 24S that is inside) the side portion 16S at the vehicle width direction middle side of the seatback 16, but the present invention is not limited thus. For example, a structure is possible in which the armrest 20 is provided at both the side portion 16S and a side portion of the seatback 16 at the vehicle width direction outer side.

In the exemplary embodiment described above, in the stowed mode of the armrest 20, the distal end 20S is at a position that is oriented upward, but the present invention is not limited thus. For example, the armrest 20 may be stowed in a position (an attitude) in which the distal end 20S is oriented downward. Furthermore, the armrest is not limited to a structure that is the tiltable-type armrest 20 but may be, for example, a structure provided with an armrest that is always in the usage mode. For this structure, a structure is desirable in which the narrow portion 11N of the airbag module 11 is disposed to forward relative to a connecting (fixing) portion between this fixed-type armrest and the seatback frame 24.

In the exemplary embodiment described above, an example is illustrated in which the turning pivot portion 22 includes the tubular spacer 22C that serves as the cover member, but the present invention is not limited thus. For example, a structure is possible that includes a cover member in a half-tube shape or a flat plate shape that covers only the front of the turning shaft 22S, and a structure is possible in which a cover member is not provided.

In the exemplary embodiment described above, an example is illustrated in which the region of the side airbag 28 that serves as the lower portion 28L is bellows-folded and the region that serves as the upper portion 28U is roll-folded to form the airbag module 11, but the present invention is not limited thus. For example, a structure is possible in which the whole of the side airbag 28 is bellows-folded, and structures are possible in which the folding of the side airbag 28 includes an alternative folding mode. Moreover, in a structure in which the lower portion is bellows-folded and the upper portion is roll-folded, a boundary between the upper portion and the lower portion is not limited to the horizontal line HL according to the above exemplary embodiment (a horizontal line passing through at a vicinity of the upper end of the seatback 16) but may be specified as appropriate.

In the exemplary embodiment described above, an example is illustrated in which a portion at the lower end side of the airbag module 11 overlaps with the armrest 20 in the usage mode in side view, but the present invention is not limited thus. For example, a structure is possible in which a vertical direction central portion of the airbag module 11 overlaps with the armrest 20 in the usage mode in side view.

It will be clear that the present invention may be embodied with numerous modifications within a scope that does not depart from the gist of the present invention. For example, the structures (elements) of the exemplary embodiments and variant examples described above may be combined or substituted.

What is claimed is:

1. A far side airbag device comprising an airbag disposed between a frame and an armrest, the frame being provided at a side portion at a vehicle width direction middle side of a seatback, and a proximal end of the armrest being connected to the frame, wherein
    in an inflated and expanded state of the airbag, a vertical direction portion of the airbag overlaps with the armrest in a usage mode of the armrest in side view,
    in a folded state of the airbag, the vertical direction portion of the airbag overlaps with the armrest in the usage mode in side view, and
    the airbag in the folded state is disposed such that the vertical direction portion is disposed at a front side relative to a connecting structure that connects the armrest to the frame.

2. The far side airbag device according to claim 1, wherein in the inflated and expanded state, a portion at a lower end side of the airbag overlaps with the armrest in side view, and in the folded state, the portion at the lower end side is disposed to overlap with the armrest in side view.

3. The far side airbag device according to claim 1, wherein a region of the airbag that serves as a lower portion in the vertical direction in the inflated and expanded state is folded in a bellows fold, and gas is supplied to the region that serves as the lower portion.

4. The far side airbag device according to claim 3, wherein a region of the airbag that serves as an upper portion in the inflated and expanded state is folded in a roll fold, the upper portion including a region that is configured to be disposed sideward of a head of an occupant.

5. The far side airbag device according to claim 1, wherein: a portion of the airbag is folded in a bellows fold, and, in the inflated and expanded state of the airbag, the portion of the airbag that is folded in the bellows fold corresponding, in the inflated and expanded state, to a region of the airbag that serves as a lower portion in the vertical direction, with the bellows having fold lines forming angles with respect to a horizontal line that gradually increase from an upper side to a lower side, and gas is supplied to the region that serves as the lower portion.

6. A vehicle seat comprising:
a seatback;
an armrest of which a proximal end is connected to a frame, the frame being provided at a side portion at a vehicle width direction middle side of the seatback, and a distal end of the armrest projecting forward from the seatback in a usage mode of the armrest; and
a far side airbag device including an airbag disposed between the frame and the proximal end of the armrest,
in an inflated and expanded state of the airbag, a vertical direction portion of the airbag overlapping with the armrest in the usage mode in side view, and
in a folded state of the airbag, the vertical direction portion of the airbag overlapping with the armrest in the usage mode in side view.

7. The vehicle seat according to claim 6, wherein in the inflated and expanded state, a portion at a lower end side of the airbag overlaps with the armrest in side view, and in the folded state, the portion at the lower end side is disposed to overlap with the armrest in side view.

8. The vehicle seat according to claim 6, wherein the airbag in the folded state is disposed such that the vertical direction portion is disposed at a front side relative to a connecting structure that connects the armrest to the frame.

9. The vehicle seat according to claim 8, wherein the armrest is connected to the seatback via a turning pivot portion that serves as the connecting structure, the armrest being connected to be switchable, by turning about the proximal end side thereof, between the usage mode in which the distal end projects forward from the seatback and a stowed mode in which the armrest is stowed along the seatback in side view.

10. The vehicle seat according to claim 9, wherein the turning pivot portion comprises: a turning shaft to which the armrest is fixed, the turning shaft being turnably supported at the frame; and a cover member that covers the turning shaft from at least the seat front side thereof.

11. The vehicle seat according to claim 6, wherein a region of the airbag that serves as a lower portion in the vertical direction in the inflated and expanded state is folded in a bellows fold, and gas is supplied to the region that serves as the lower portion.

12. The vehicle seat according to claim 11, wherein a region of the airbag that serves as an upper portion in the inflated and expanded state is folded in a roll fold, the upper portion including a region that is configured to be disposed sideward of a head of an occupant.

13. The vehicle seat according to claim 6, wherein: a portion of the airbag is folded in a bellows fold, and, in the inflated and expanded state of the airbag, the portion of the airbag that is folded in the bellows fold corresponding, in the inflated and expanded state, to a region of the airbag that serves as a lower portion in the vertical direction, with the bellows having fold lines forming angles with respect to a horizontal line that gradually increase from an upper side to a lower side, and gas is supplied to the region that serves as the lower portion.

* * * * *